(12) United States Patent
Lonsdorfer et al.

(10) Patent No.: US 8,845,946 B2
(45) Date of Patent: Sep. 30, 2014

(54) METHOD AND DEVICE FOR MANUFACTURING A FIBER COMPOSITE COMPONENT WITH AN INTEGRAL STRUCTURAL DESIGN

(75) Inventors: Georg Lonsdorfer, Stade (DE); Hauke Seegel, Nahrendorf (DE); Klaus Rode, Oberhaching (DE); Andreas Pau, Markdorf (DE)

(73) Assignee: Airbus Operations GmbH, Hamburg (DE)

( * ) Notice: Subject to any disclaimer, the term of this patent is extended or adjusted under 35 U.S.C. 154(b) by 699 days.

(21) Appl. No.: 12/979,429

(22) Filed: Dec. 28, 2010

(65) Prior Publication Data

US 2011/0156305 A1 Jun. 30, 2011

Related U.S. Application Data

(60) Provisional application No. 61/290,521, filed on Dec. 29, 2009.

(30) Foreign Application Priority Data

Dec. 29, 2009 (DE) .......................... 10 2009 060 690
Dec. 12, 2010 (DE) .......................... 10 2010 062 870

(51) Int. Cl.
*B32B 37/00* (2006.01)
*B29C 70/44* (2006.01)
*B29C 70/54* (2006.01)

(52) U.S. Cl.
CPC ............ *B29C 70/443* (2013.01); *B29C 70/546* (2013.01)
USPC ............................ 264/261; 264/258; 156/285

(58) Field of Classification Search
USPC .................................. 264/261, 258; 156/285
See application file for complete search history.

(56) References Cited

U.S. PATENT DOCUMENTS

2004/0256053 A1* 12/2004 Burpo et al. .................. 156/285
2010/0080952 A1* 4/2010 Suzuki et al. ................. 428/113

FOREIGN PATENT DOCUMENTS

| DE | 102008029518 A1 | 12/2009 |
| WO | WO 2008090911 A1 * | 7/2008 |
| WO | WO 2008152582 A2 * | 12/2008 |

* cited by examiner

*Primary Examiner* — Galen Hauth
(74) *Attorney, Agent, or Firm* — Leydig, Voit & Mayer, Ltd.

(57) ABSTRACT

A method for manufacturing a fiber composite component having an integral structural design includes positioning a sheet-like fibrous semi-finished product in a mold that defines an outer contour of the fiber composite component. Dimensionally stable fibrous semi-finished products, each having dimensions corresponding to a respective portion of the manufactured fiber composite component, are arranged on the sheet-like fibrous semi-finished product. The dimensionally stable fibrous semi-finished products are stabilized and fixed in place using mold cores. The semi-finished products are resin infiltrated using one of a first or a second gating process so as to form a construct. The first gating process includes gating via the mold cores at a head of each dimensionally stable fibrous semi-finished product and performing extraction in an area of the mold. The second gating process including gating in an area of the mold and performing extraction via the mold cores at the head of each dimensionally stable fibrous semi-finished product. The construct is hardened and demolded by removing the mold cores.

8 Claims, 22 Drawing Sheets

METHOD AND DEVICE FOR MANUFACTURING A FIBER COMPOSITE COMPONENT WITH AN INTEGRAL STRUCTURAL DESIGN

CROSS REFERENCE TO RELATED APPLICATIONS

This application claims priority to U.S. Provisional Patent Application No. 61/290,521, filed on Dec. 29, 2009, German Patent Application No. DE 10 2009 060 690.4, filed on Dec. 29, 2009 and German Patent Application No. DE 10 2010 062 870.0 filed on Dec. 12, 2010, which are each hereby incorporated by reference herein in their entirety.

FIELD

The invention relates to a method for manufacturing a fiber composite component with an integral structural design, and a device for implementing such a method.

BACKGROUND

Fuselage segments of aircraft are conventionally fabricated via metal construction out of skin shells. The skin shells each consist of a sheet-like skin field, which is reinforced by a rear structure comprised of stiffening elements extending in a longitudinal and circumferential direction. The longitudinal reinforcements are attached to the metal body directly via riveting. The circumferential reinforcements are attached indirectly via riveted-on fittings.

However, more recent times have seen an increased use of fiber composites such as carbon fiber reinforced or glass fiber reinforced plastic components for manufacturing the fuselage segments. In one method of construction, the skin fields and stiffening elements along with the fittings are separately fabricated out of a resin-impregnated, web-like fiber plies, such as prepregs, and riveted after being subjected to final mechanical processing. The process of manufacturing a large-area skin field can be readily automated, thus making it cost-effective. However, the manufacture of stiffening elements and fittings pushes up the costs, since they need to be subsequently machined to the final dimensions, and then integrated into the skin field via riveting.

In light of the very high costs for riveting, in particular for riveting during use in carbon fiber-reinforced plastic compounds, a very high tolerance compensation, which can lead to assembly problems in particular given large component dimensions, as well as an expensive final machining of the stiffening elements and fittings, attempts are increasingly being made to design the fuselage segments integrally with a rear structure. In this so-called integral mode of construction, at least mostly the stiffening elements running in a longitudinal direction are integrally designed with the skin shell. This method is characterized by manufacturing in one shot, i.e., no subsequent riveting is necessary, at least with respect to the longitudinal reinforcements.

For example, DE 10 2008 029 518 A1 shows an infusion method. A thermoplastic binder is here used to position dimensionally stable fibrous semi-finished products on a dimensionally unstable, sheet-like fibrous semi-finished product that represents the skin field, and used as a support for dimensionally unstable fibrous semi-finished products. In a resin infusion process and an ensuing hardening process, the dimensionally unstable fibrous semi-finished products are bonded with the dimensionally stable fibrous semi-finished products to the skin shell with integrated rear structure. In a respective central region spaced apart in a vertical direction by a component head, the dimensionally stable semi-finished products acting as the mold cores each have an inner or integral resin supply channel extending in the longitudinal direction, which after the hardening process forms an integral component of the skin shell filled with resin residue. During infusion, the resin is upwardly pushed or guided from the resin supply channel in the direction of the component head, and downwardly in the opposite direction toward the sheet-like, foot-shaped fibrous semi-finished product. However, problems are posed by the positioning of the dimensionally unstable or dry fibrous semi-finished products on the mold cores, and the associated high technical outlay and reproducibly high component quality, for example with respect to a uniform resin distribution. In addition, the hardened resin residue arranged in the integral supply channels forms fiber-free component areas that reduce the component stability.

SUMMARY

An aspect of the invention is to provide a method and device for manufacturing a fiber composite component with an integral structural design that eliminates the aforementioned disadvantages and enables a high process safety and reproducible component quality.

In an embodiment, the present invention provides a method for manufacturing a fiber composite component having an integral structural design including positioning a sheet-like fibrous semi-finished product in a mold that defines an outer contour of the fiber composite component. Dimensionally stable fibrous semi-finished products, each having dimensions corresponding to a respective portion of the manufactured fiber composite component, are arranged on the sheet-like fibrous semi-finished product. The dimensionally stable fibrous semi-finished products are stabilized and fixed in place using mold cores. The semi-finished products are resin infiltrated using one of a first or a second gating process so as to form a construct. The first gating process includes gating via the mold cores at a head of each dimensionally stable fibrous semi-finished product and performing extraction in an area of the mold. The second gating process including gating in an area of the mold and performing extraction via the mold cores at the head of each dimensionally stable fibrous semi-finished product. The construct is hardened and demolded by removing the mold cores In another embodiment, the present invention provides a device for manufacturing a fiber composite component having an integral structural design. The device includes a mold configured to accommodate a sheet-like fibrous semi-finished product and mold cores configured to support dimensionally stable fibrous semi-finished products that form stiffening elements integral with the sheet-like fibrous semi-finished product. Each mold core includes at least one integral receiving area for accommodating a respective dimensionally stable fibrous semi-finished product and at least one integral supply channel disposed on a component head side. Each integral supply channel is open to a corresponding receiving area and forms a gating or extraction location.

BRIEF DESCRIPTION OF THE DRAWINGS

Preferred exemplary embodiments of the invention will be explained in greater detail below based on schematic representations shown in the drawings, in which.

The same structural elements bear the same reference numbers on the figures, wherein several figures depict only a few elements with their reference numbers for the sake of clarity.

DETAILED DESCRIPTION

Figure 1:
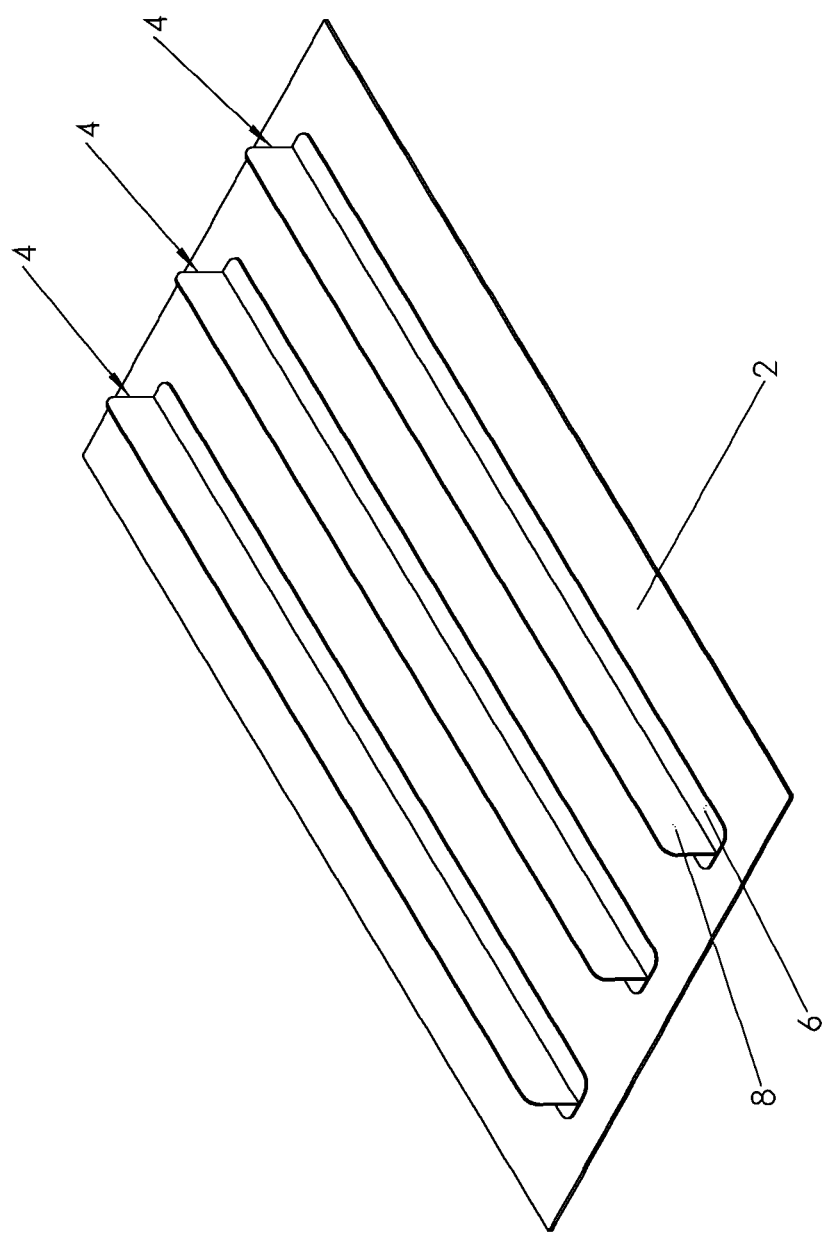
FIG. 1 is a perspective view of a fiber composite component manufactured according to the invention.

In a method according to an embodiment of the invention for manufacturing a fiber composite component with an integral structural design, a sheet-like fibrous semi-finished product is first positioned on a mold that sets the outer contour of the fiber composite component. Dimensionally stable fibrous semi-finished products fabricated to their final dimensions are then arranged on the sheet-like fibrous semi-finished product based on a progression of stiffening elements. The dimensionally stable fibrous semi-finished products are then stabilized and fixed in place with mold cores. This is followed by a resin infusion, during which gating takes place via the mold cores at the head of the dimensionally stable fibrous semi-finished products and extraction takes place in the area of the mold or gating takes place in the area of the mold and extraction via the mold cores takes place at the head of the dimensionally stable fibrous semi-finished products. In a final step, the construct is hardened and demolded, during which the mold cores are removed. The advantage to the method according to the invention is that the arrangement of the gating and extraction locations according to the invention causes the fibrous semi-finished products to be completely positioned between the gating and extraction locations, so that a resin or matrix material is reliably guided in each component region. Resin-free cavities that reduce the component quality cannot be formed. Also advantageous is that at least the fibrous semi-finished products that form the stiffening elements have already been fabricated to their final dimensions, eliminating any intricate follow-up machining after the structure has been demolded. Another advantage to the method according to the invention is that the dimensional stability of the fibrous semi-finished products comprising the stiffening elements makes them easy to handle in a precise manner, and enables their positioning on the sheet-like fibrous semi-finished product. Dimensionally stable here means that the fibrous semi-finished products are provided with a binder, for example a thermoplastic binder, which has only been solidified, and softens when exposed to heat, causing the fibrous semi-finished products to lose their intrinsic stability. However, they are again transformed into their dimensionally stable condition at a temperature below a specific solidification point. In addition, as opposed to prior art, no fiber-free component regions are formed, so that the fiber composite components manufactured according to the invention exhibit an optimal stability.

In a preferred exemplary embodiment, gating takes place in a punctiform or linear manner in the sheet-like fibrous semi-finished product.

In an alternative variant, gating takes place in a punctiform or linear manner over at least a lateral edge region of the planar fibrous semi-finished product.

In another preferred exemplary embodiment, extraction takes place in a punctiform or linear manner in the sheet-like fibrous semi-finished product.

In an alternative variant, extraction takes place in a punctiform or linear manner over at least a lateral edge region of the planar fibrous semi-finished product.

In one exemplary embodiment, the sheet-like fibrous semi-finished product is positioned in a frame on the mold. The frame can already be integrated into the mold, or nearly flexibly built thereupon. The frame defines a cavity, in which the fibrous semi-finished product is laterally securely guided, and resin or vacuum leaks are also prevented. In particular, the size or planar extension of the cavity corresponds to a final dimension or desired dimension of the planar fibrous semi-finished product, thereby also eliminating the need for extensive follow-up machining relative to the planar fibrous semi-finished product.

It is most preferred that the mold cores extend over the planar fibrous semi-finished product and rest at the ends on the mold, which results in a stable position of the latter.

In particular in the case of large-area and/or concavely curved fiber composite components, it may be advantageous for the mold cores to be supported on at least one adjacent mold core in addition to having their ends rest on the mold.

A device according to the invention for implementing such a method has a mold for accommodating a planar fibrous semi-finished product and mold cores for supporting dimensionally stable fibrous semi-finished products in order to form stiffening elements integral with the planar fibrous semi-finished product. The mold cores each have at least one integral receiving area for accommodating the dimensionally stable fibrous semi-finished products and at least one respective integral supply channel at the component head, which is open indirectly or directly toward the receiving area, and forms a gating or extraction location. Such a device enables a uniform distribution of matrix material in the fibrous semi-finished products and a correspondingly high and reproducible level of component quality via the mold cores abutting the dimensionally stable fibrous semi-finished products from outside.

In one exemplary embodiment, there is a fluidic connection between the respective supply channel and the receiving area via a longitudinal gap or perforated pattern. This facilitates the demolding of the hardened composite component, since the resin hardened in the supply channels is connected with the stiffening elements only via a thin resin film, and thus is correspondingly easy to remove. In addition, the gating or extraction process can be controlled via the gap, for example in terms of progress and resin quantity.

In an especially robust device, the supply channels are unilaterally closed. However, it is basically also possible to join the supply channels with each other in a meandering way.

The positioning of the mold core can be simplified if the mold cores are divided at least into two parts and having the respective gap lying in the plane separating the two mold core sections.

It is especially easy to position the mold cores if the latter are divided into their core sections symmetrically to the longitudinal axis of the stiffening elements to be formed. In addition, the core sections can be combined as desired to yield one respective mold core during the symmetrical separation of the mold cores.

FIG. 1 depicts a fiber composite component 1 manufactured according to an embodiment of the invention. The latter is a skin shell of an aircraft fuselage shown two-dimensionally to simplify the drawing, which consists of a skin field 2 and an integrally secured rear structure for reinforcing the skin field 2. The rear structure has at least a plurality of stiffening elements 4 that are arranged parallel, one next to the other, and extend in the longitudinal direction. The stiffening elements 4 are each T-shaped, with a foot 6 attached to the skin field 2, and a web 8 extending centrally and orthogonally from the foot 6. A device according to the invention for manufacturing the skin shell 1 has a mold 12, two longitudinal strips 14, two transverse strips 16, mold cores or carrying pieces 20, spacers 22, filler pieces 24, pressure inserts 30 and pipe sockets 32.

Figure 2:
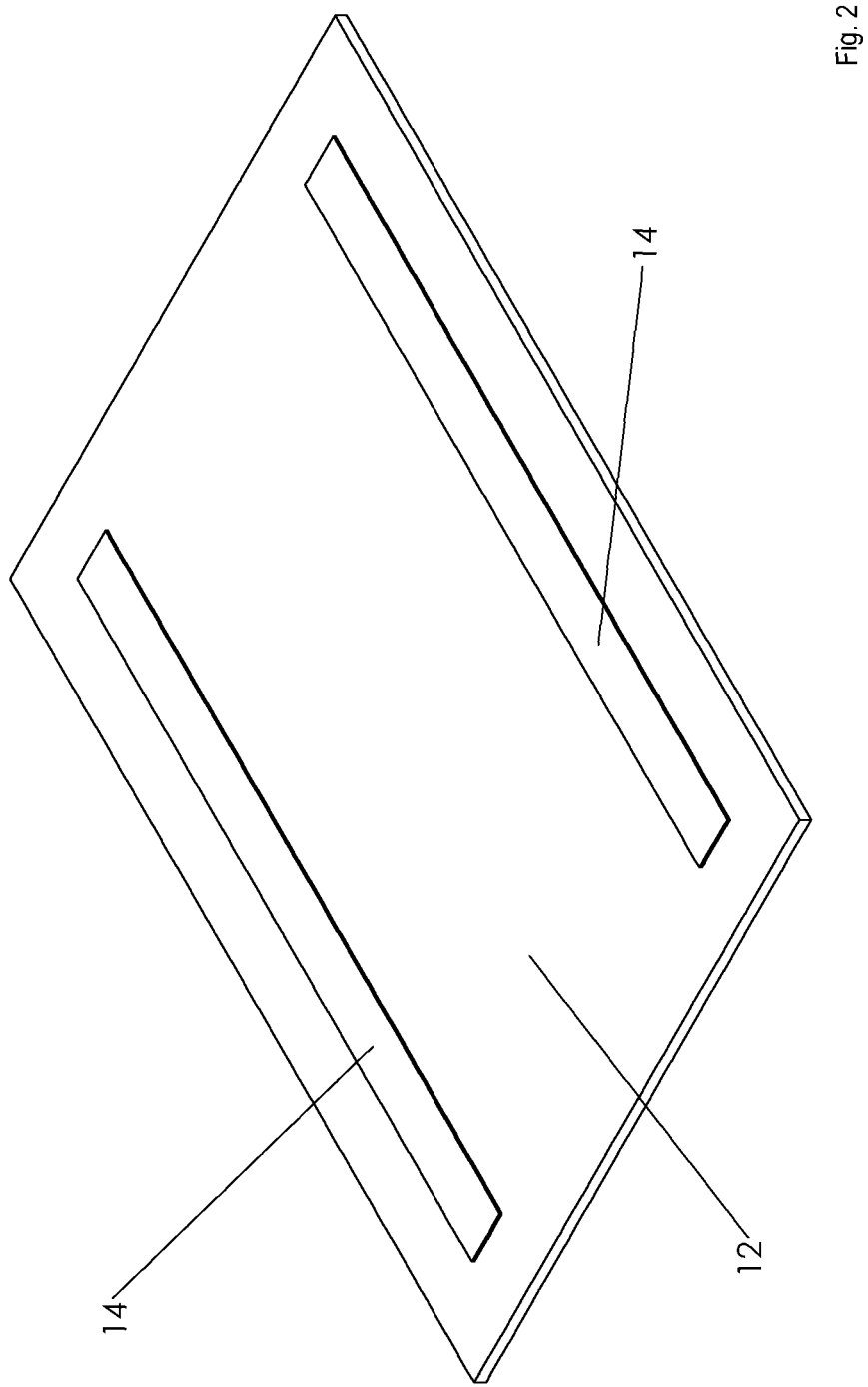
FIGS. 2 to 22 show procedural steps for manufacturing the composite component from FIG. 1 and the step-by-step assembly of a device according to the invention.
Figure 3:
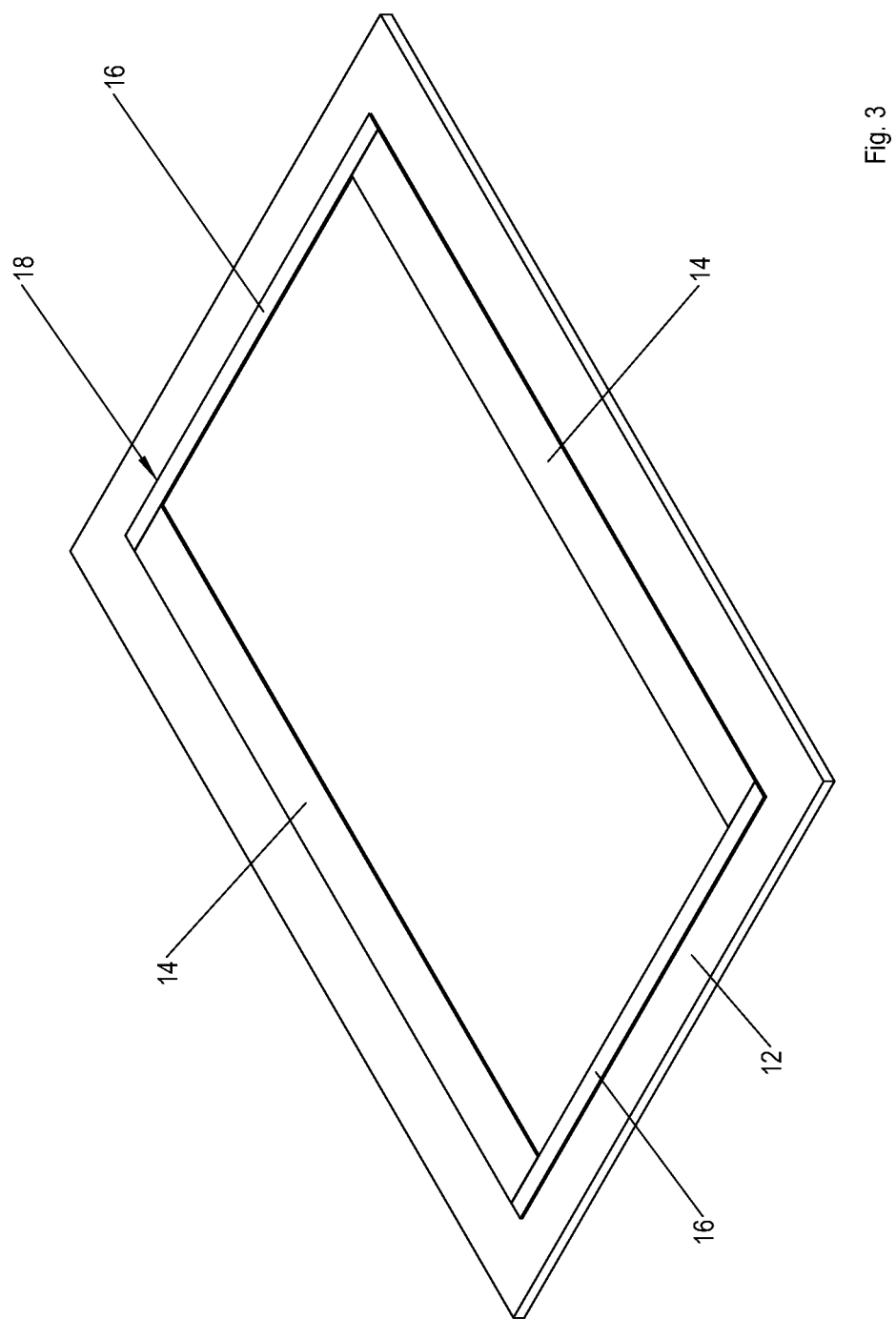
Figure 4:
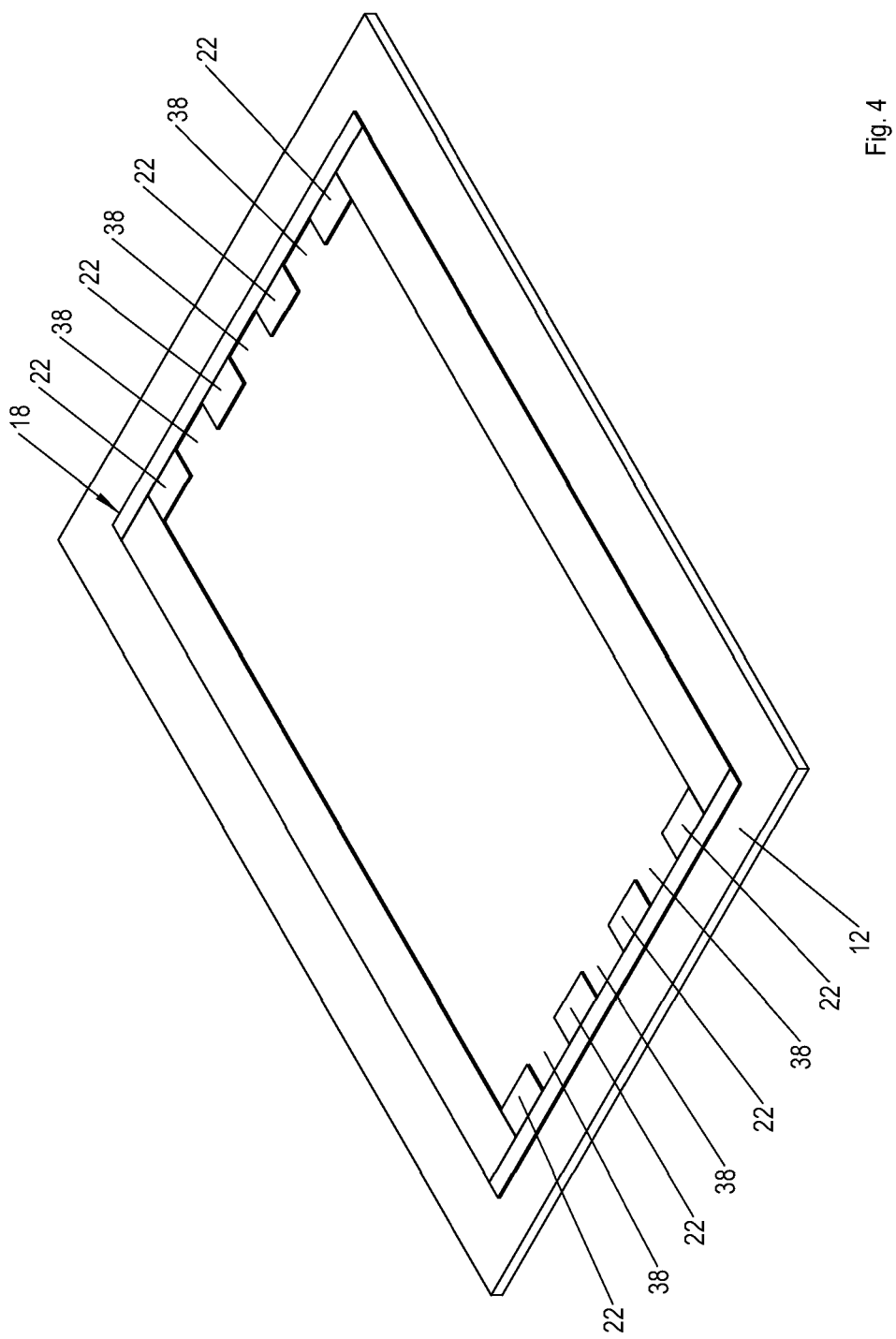
Figure 5:
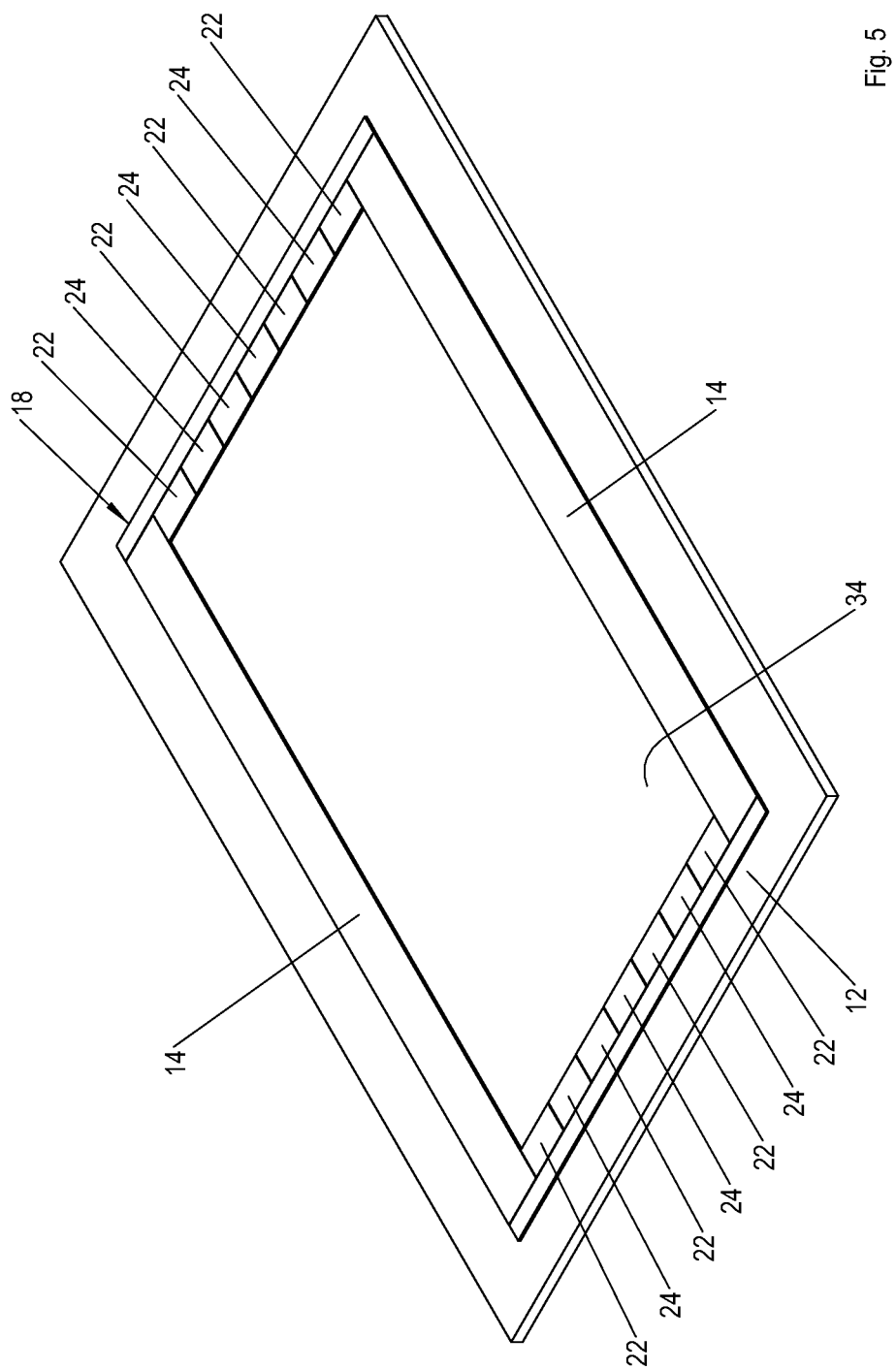
Figure 6:
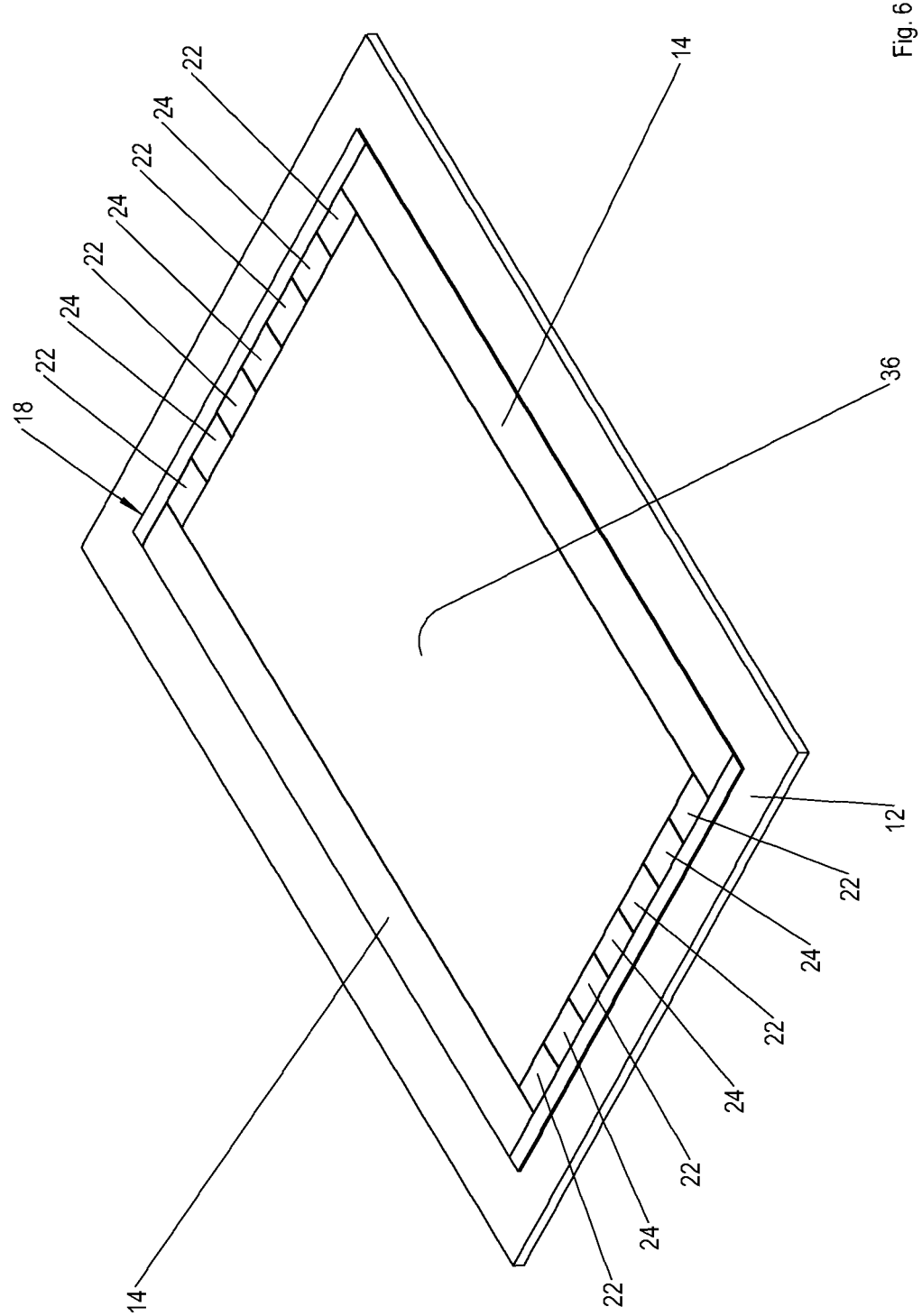

As shown on FIGS. 2 to 6, a cavity 34 is formed on the mold 12 reflecting an outside contour of the respective fuselage segment at the beginning of the process to accommodate a sheet-like fibrous semi-finished product 36, i.e. a preform, so as to form the skin shell 2. In principle, the planar extension or size of the cavity 34 corresponds to the planar extension of the skin shell 1, so that the skin field 2 does not have to be subjected to complex follow-up machining, but rather already exhibits the final dimensions. To this end, the longitudinal strips 14 and transverse strips 16 are arranged like a frame on the mold 12 (FIGS. 2 and 3). The latter is here aligned horizontally. The spacers 22 are then positioned along the opposing transverse strips 16 inside the frame 18, respectively spaced apart from each other in the area of a transverse strip 16 in such a way as to create a clearance 38 between them to support the ends of the cores 20 (FIG. 4). However, after the spacers 22 have been positioned, the filler pieces 24 are initially arranged in the clearances 38 (FIG. 5). After the formation of the cavity 34 bordered by the longitudinal strips 14 in the transverse direction and by the spacers 22 and filler pieces 24 in the longitudinal direction, the sheet-like fibrous semi-finished product 36 is fitted in and re-cut as needed (FIG. 6). The fibrous semi-finished product preferably consists of a plurality of carbon fibers that are combined to form a group, woven or knit or the like. It is most preferred that it consist of dry bound or unbound fibers.

Figure 7:
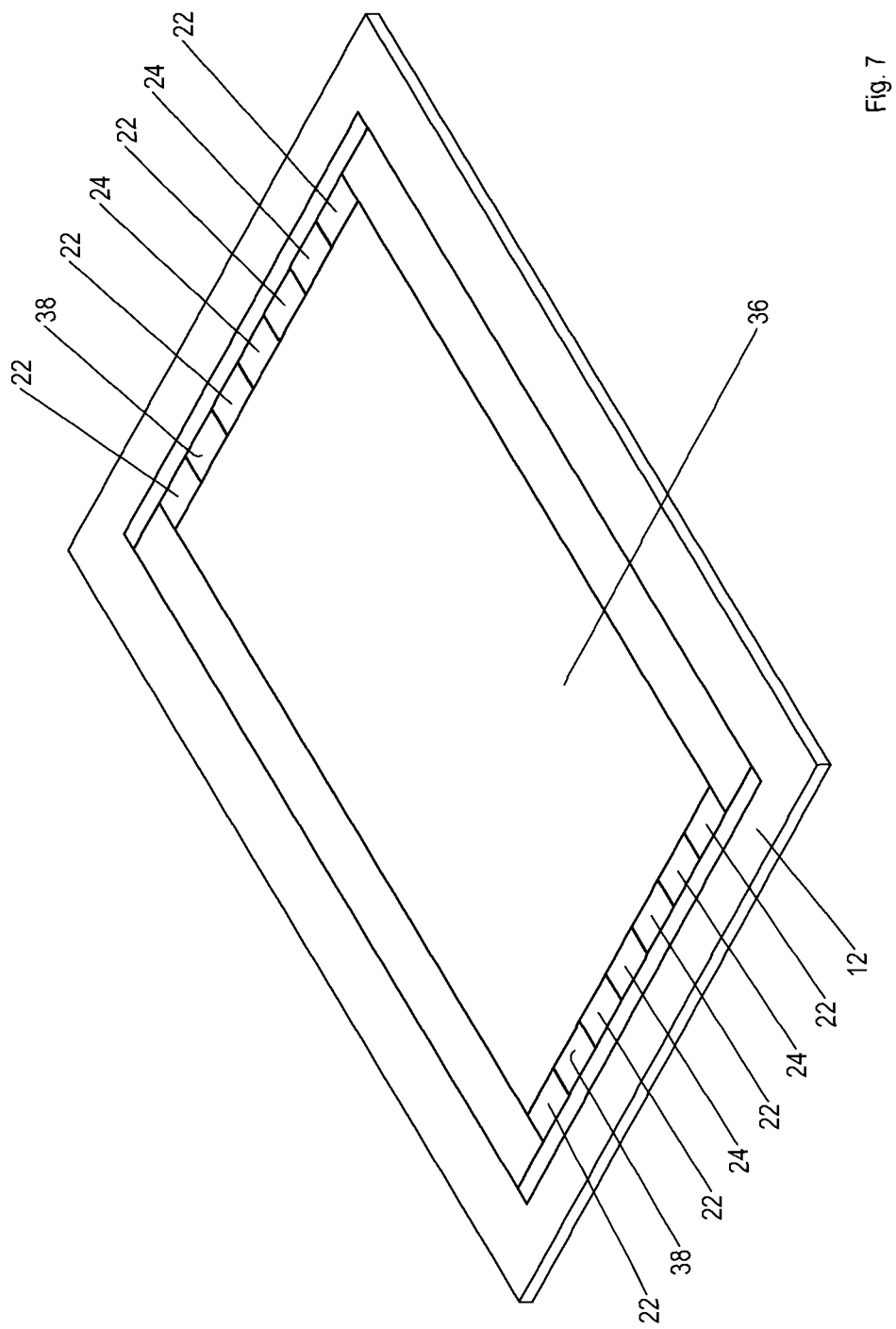
Figure 8:
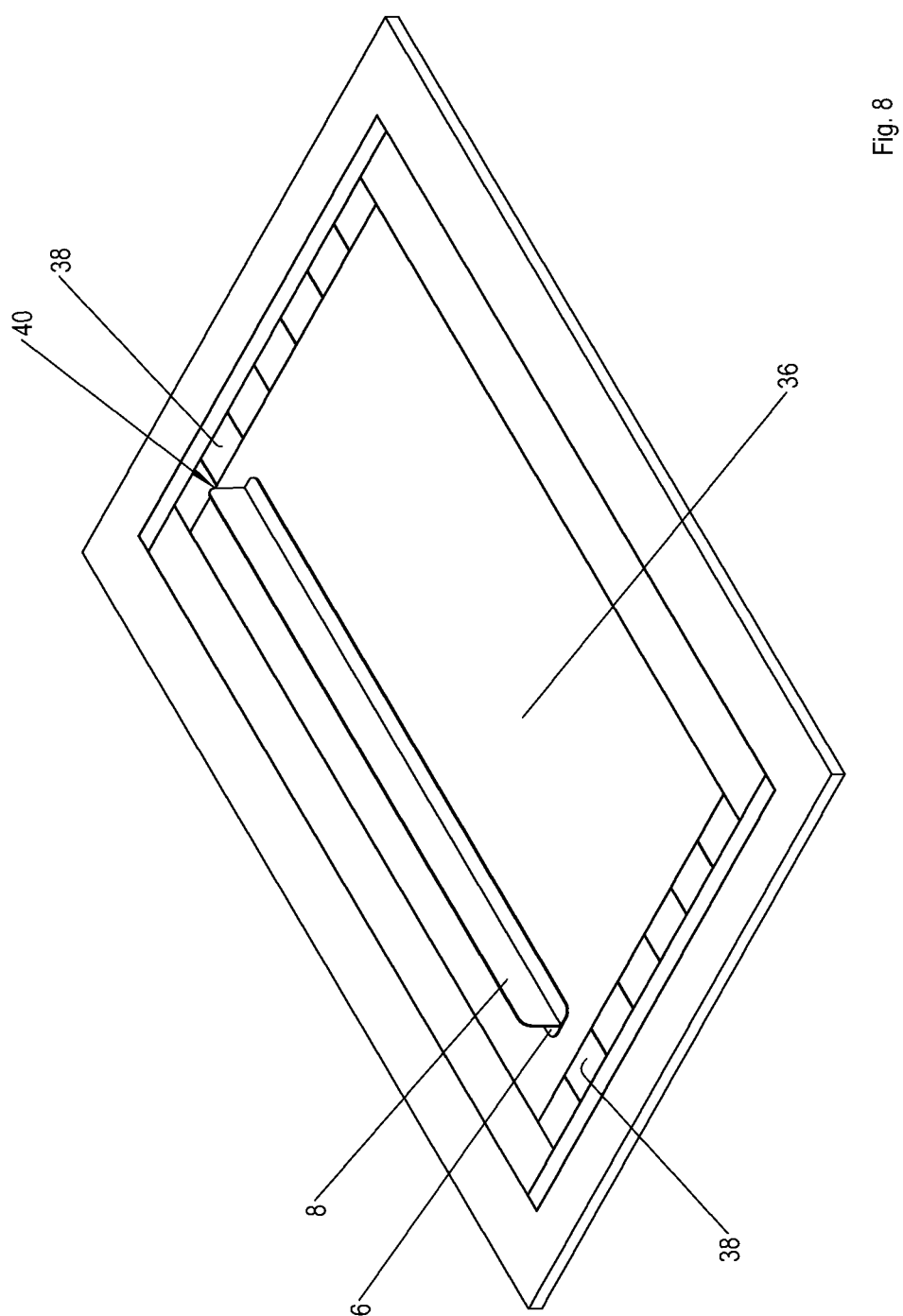

The stiffening elements are then individually and sequentially built up 4 on the sheet-like fibrous semi-finished product 36. To this end, a filler piece pair consisting of two opposing filler pieces 24 is removed from the corresponding clearances 38 between the spacers 22 as shown on FIG. 7 and a dimensionally stable fibrous semi-finished product 40, i.e. a preform, is positioned between the now free clearance pair on the planar fibrous semi-finished product 36 to form the first stiffening element 4 as depicted on FIG. 8. The dimensionally stable fibrous semi-finished product 40 has the T-shaped cross section corresponding to the stiffening element 4, with a foot 6 and a web 8. It is already fabricated to the final dimensions, and consists of a plurality of carbon fibers, which in a non-crimp fabric (NCF), woven, knit or the like are transformed into their final, T-shaped form by means of a thermoplastic binder.

Figure 9:
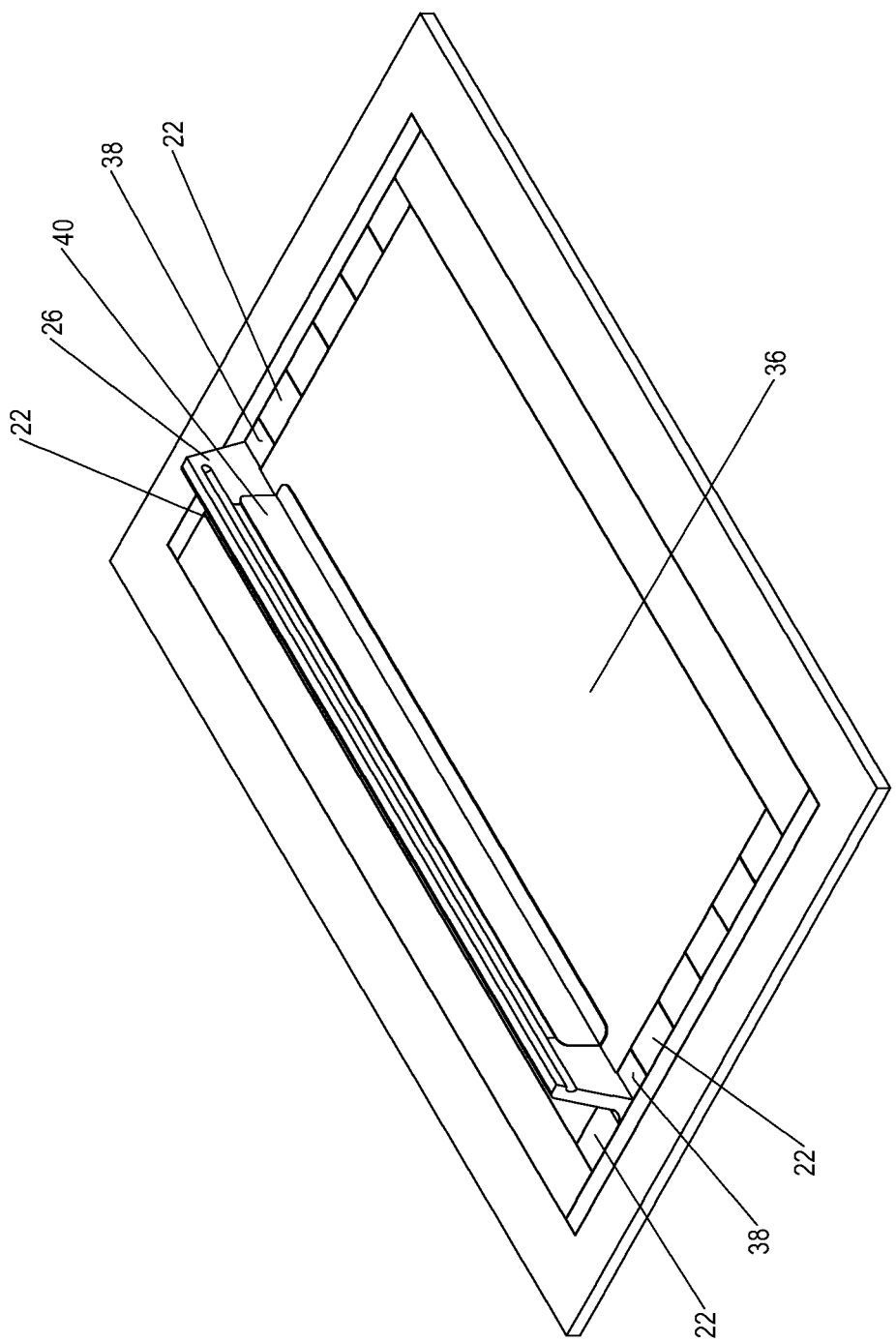
Figure 10:
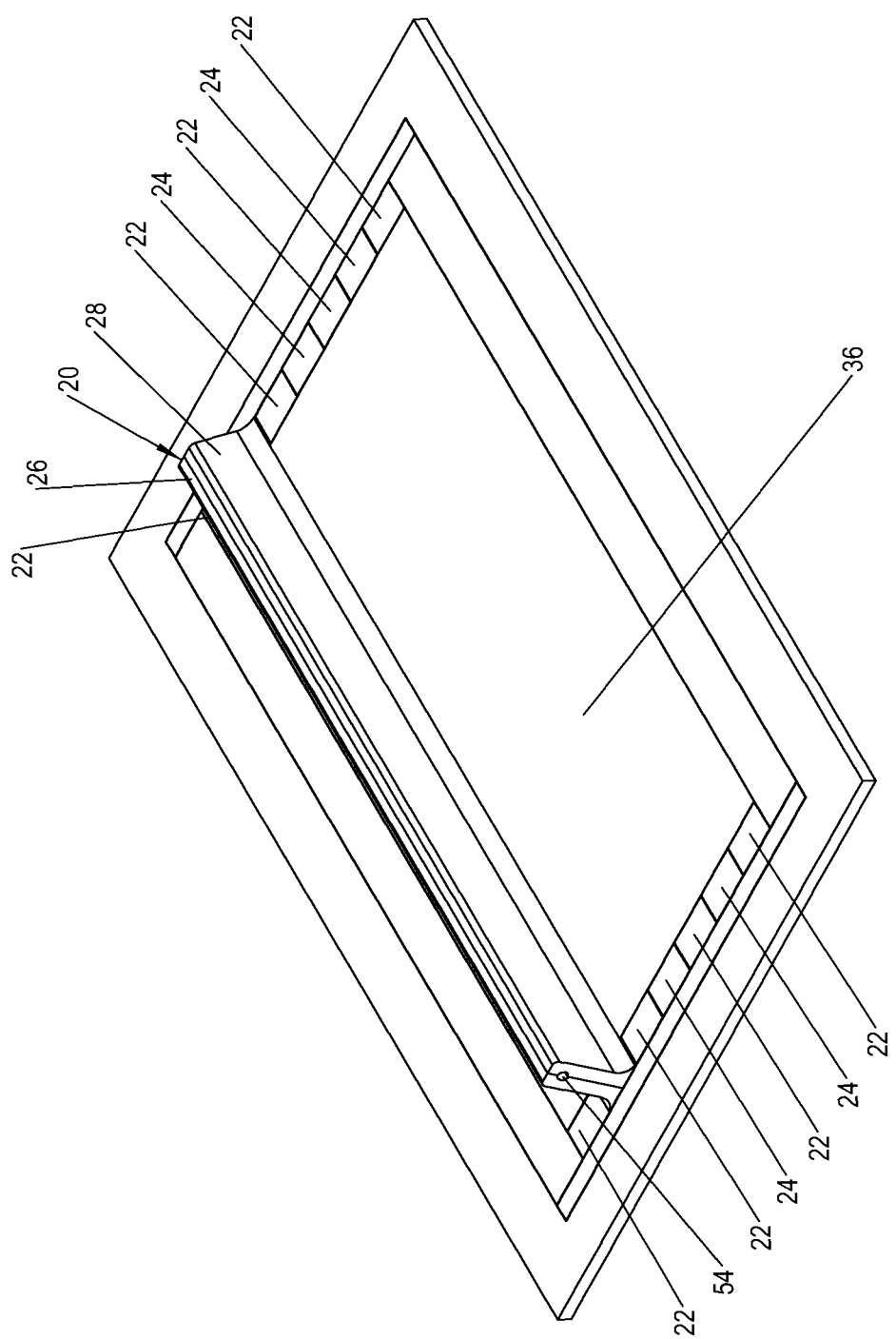

The exact positioning and exact preservation of the dimensional geometry of the dimensionally stable fibrous semi-finished product 40 takes place as depicted in FIGS. 9 and 10 via a respective one of the mold cores 20 consisting of two core sections 26, 28, which are positioned to the side of the dimensionally stable fibrous semi-finished product 40 in the transverse direction.

Figure 11:
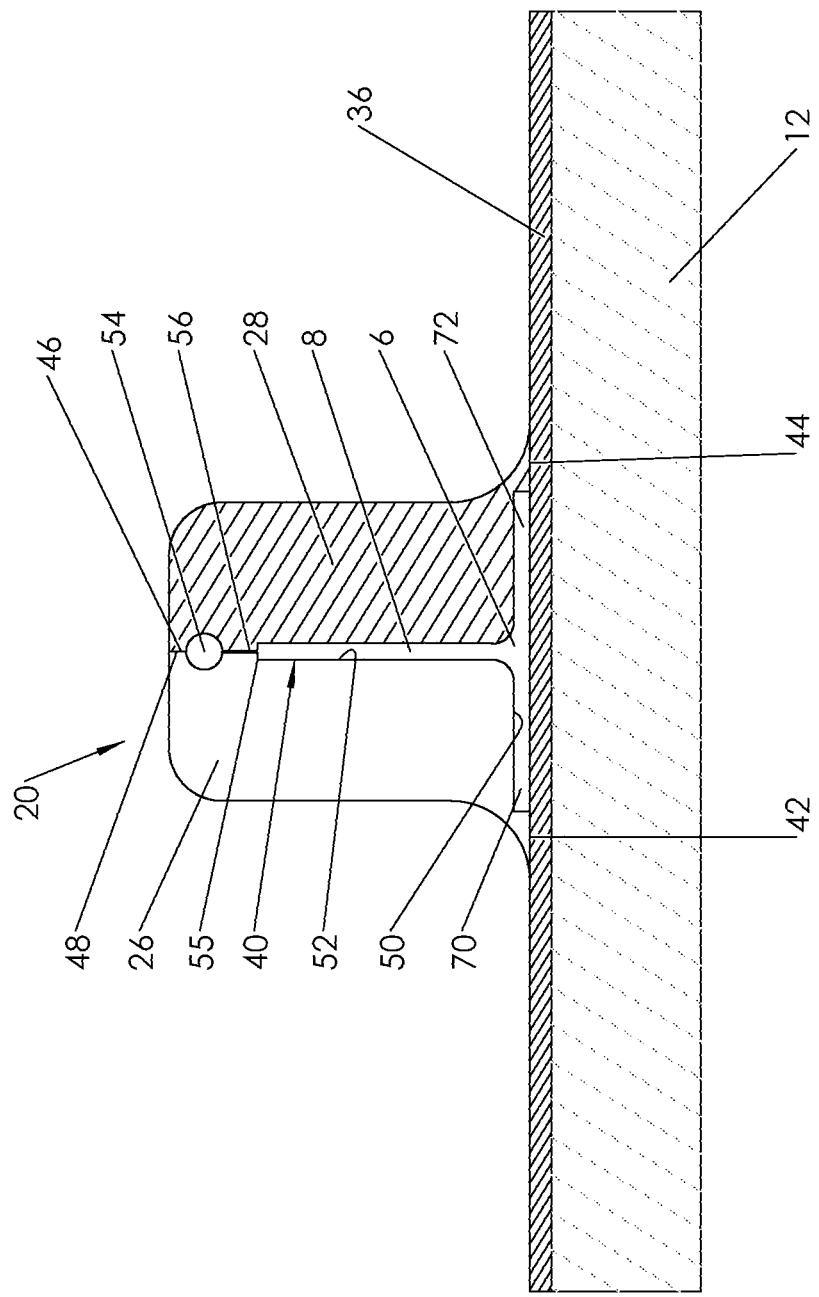
Figure 12:
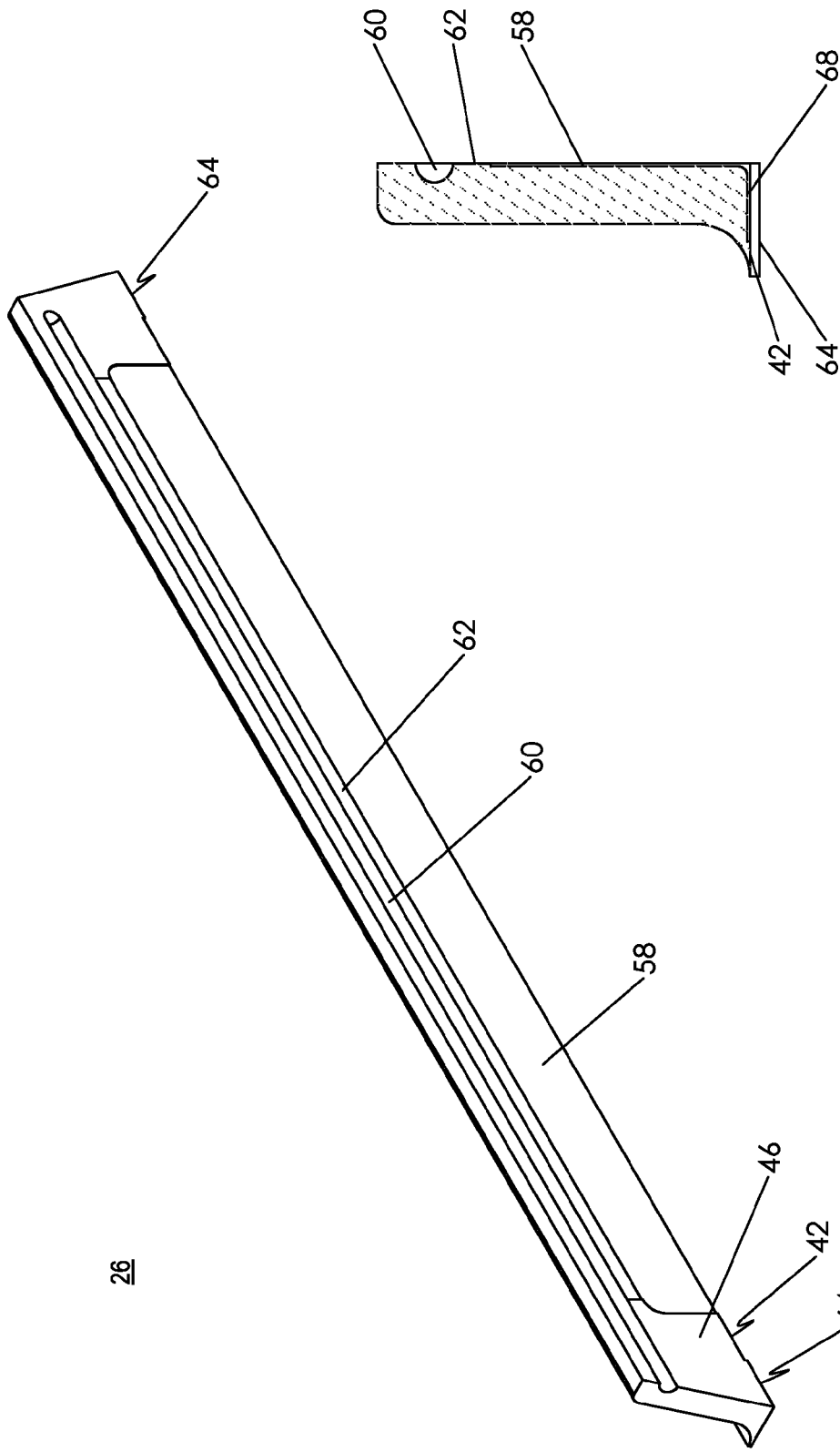
Figure 13:
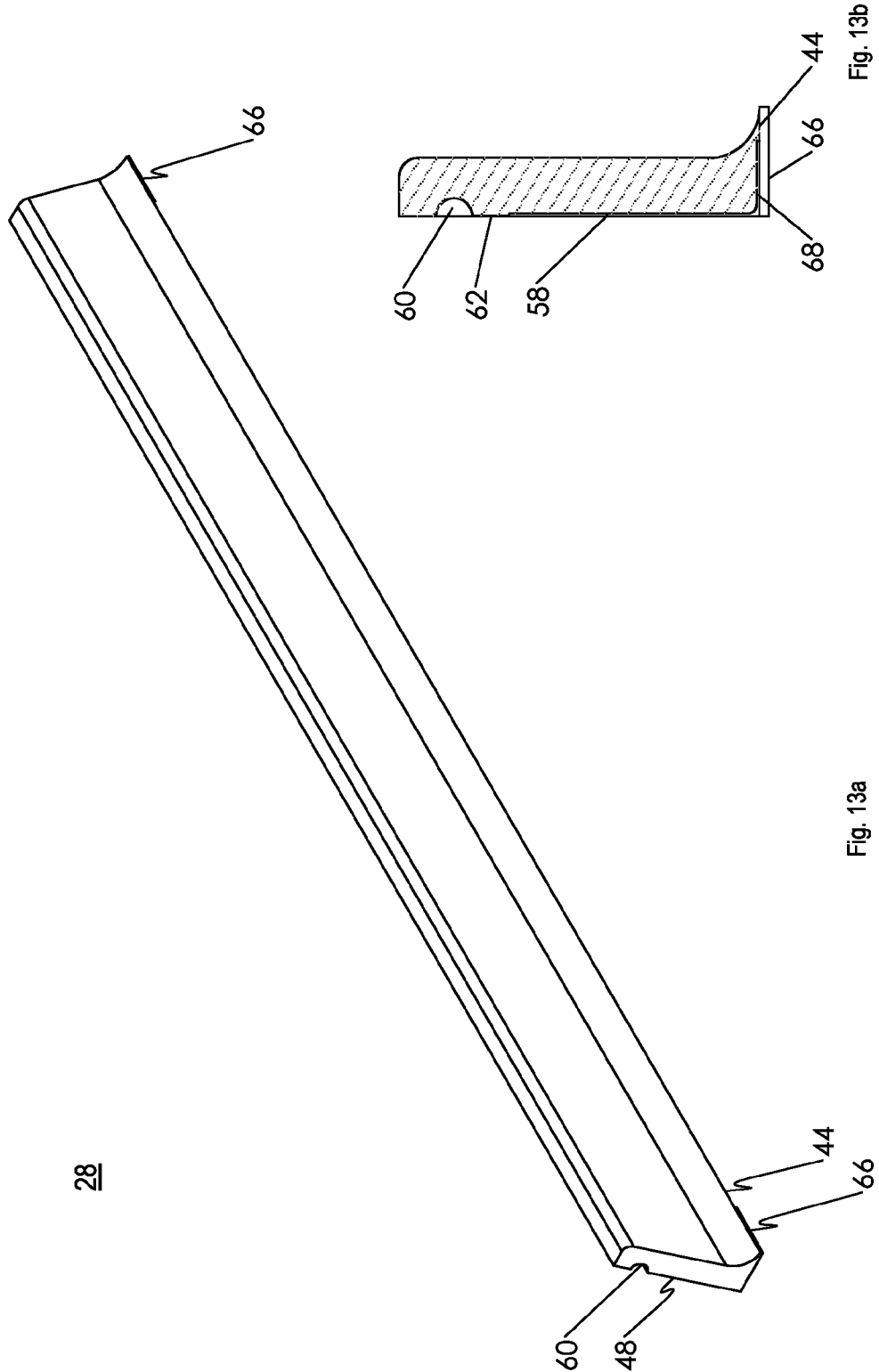

As shown in FIG. 11, the core sections 26, 28 rest against the planar fibrous semi-finished product 36 on a respective locating surface 42, 44, and adjoin with their longitudinal surfaces 46, 48 in the area of a vertical separating plane. The vertical separating plane runs in a longitudinal direction of the stiffening element 4 to be formed, so that the core sections 26, 28 of the latter is mirror symmetrical to the longitudinal axis of the stiffening element 4. To accommodate the respective dimensionally stable fibrous semi-finished product 40 with its foot 6 and its web 8, they each border a receiving area 50, 52.

A supply channel 54 is provided in a head section of the mold core 20 arranged above the receiving area 52 on the web side viewed in a vertical direction. The supply channel 54 extends along a web head 55 or a component head edge, and a gap 56 most preferably only several tenths of a millimeter thick fluidically connects it with the receiving area 52 on the web side in such a way that the fibrous semi-finished product 40 is infiltrated with a resin via the web head 55.

As depicted on FIGS. 12a, 12b and 13a, 13b, the core sections 26, 28 each have one half 58 of the receiving area 52 on the web side. They also have a first half 60 of the supply channel 54. The supply channel 54 or its halves 60 here extends in the longitudinal direction beyond the receiving area 52 on the web side, and is closed on one side. Further, the core sections 26, 28 each incorporate one half 62 of the gap 56, which essentially extends over the entire length of the receiving area 52 on the web side or its halves 58. In order to support the ends of the core sections 26, 28 on the mold 12 in the area of the clearances 38, the ends of the latter each have a support surface 64, 66 that projects forward relative to the locating surface 42, 44. The receiving area 50 on the foot side does not consist of two halves 58 with a reduced cross section like the receiving area 52 on the web side, but rather of a partial area 68 for completely accommodating a lateral foot section 70, 72 extending in the transverse direction away from the web 8 (FIG. 11). Therefore, the core sections 26, 28 form two identical L-shaped receiving areas 58, 68, as a result of which respectively equal percentages of the dimensionally stable fibrous semi-finished product 40 are accommodated in the core sections 26, 28 viewed in the transverse direction. The foot 6 of the dimensionally stable fibrous semi-finished product 40 shown here by example has no soft transition to the sheet-like fibrous semi-finished product 36 or skin field 2. Given a hafted foot 6, the partial areas 68 in the core sections 26, 28 are correspondingly tailored to the lengths and thicknesses of the fibrous semi-finished product 40.

Figure 14:
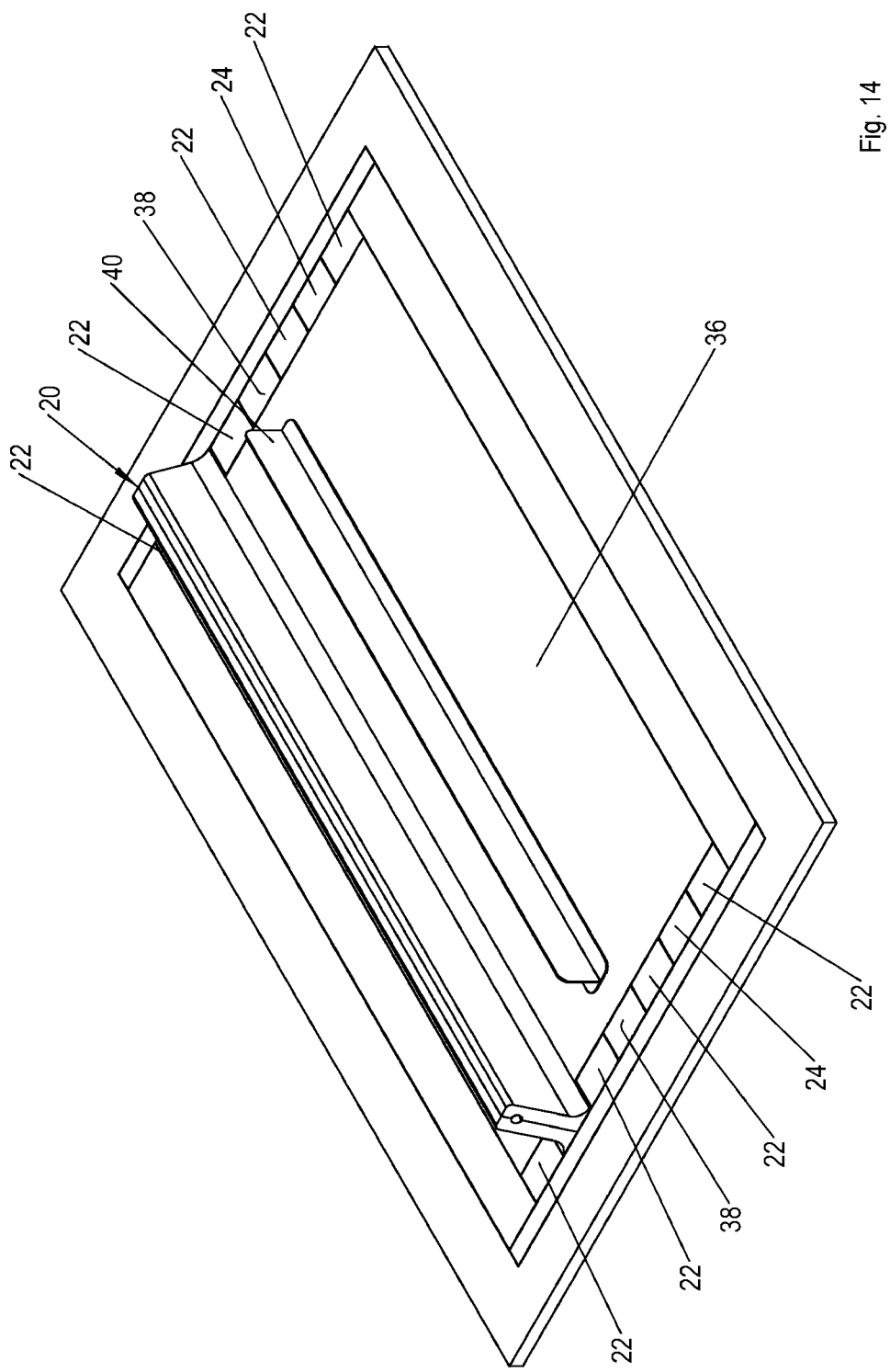
Figure 15:
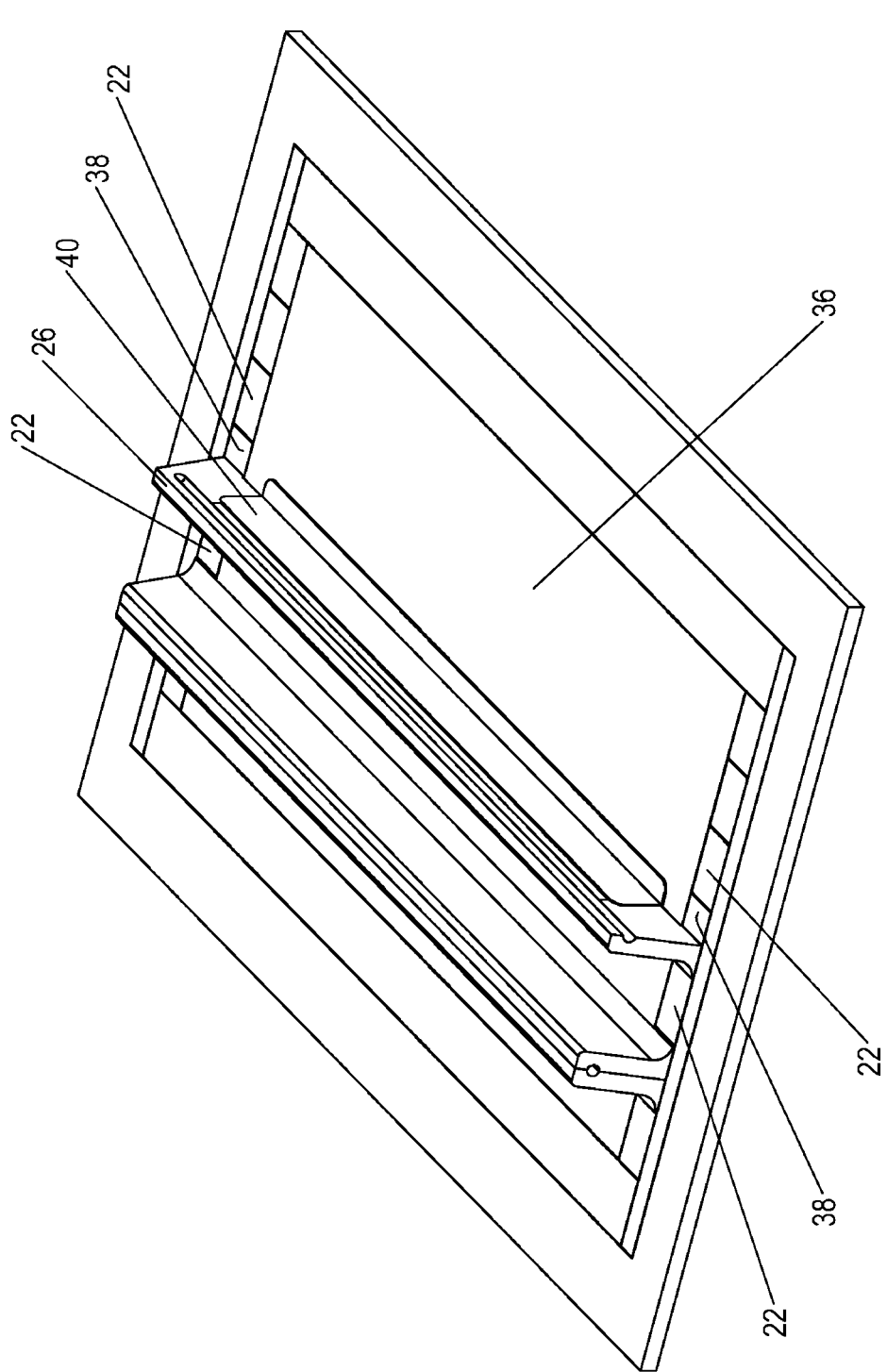
Figure 16:
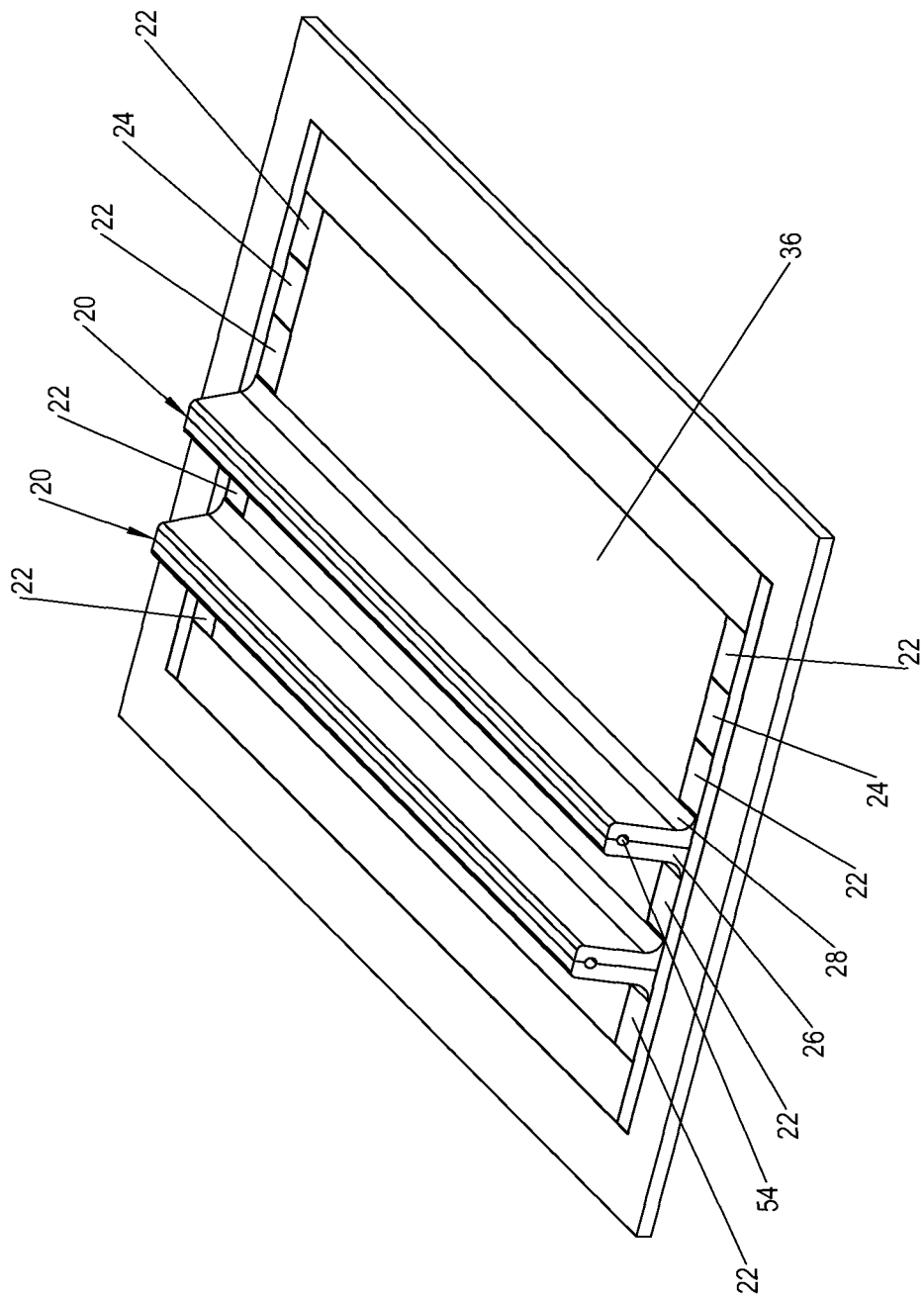

After positioning the core sections 26, 28 to support the first dimensionally stable fibrous semi-finished product 40, the additional stiffening elements 4 are formed by similarly positioning the other dimensionally stable fibrous semi-finished products 40 on the sheet-like fibrous semi-finished product 36. The next two opposing filler pieces 24 are first removed from the clearances 38 as depicted on FIG. 14, and a second dimensionally stable fibrous semi-finished product 40 is placed on the planar fibrous semi-finished product 36. The latter is then exactly aligned via the core sections 25, 26 of a second mold core 20 according to FIGS. 15 and 16.

Figure 17:
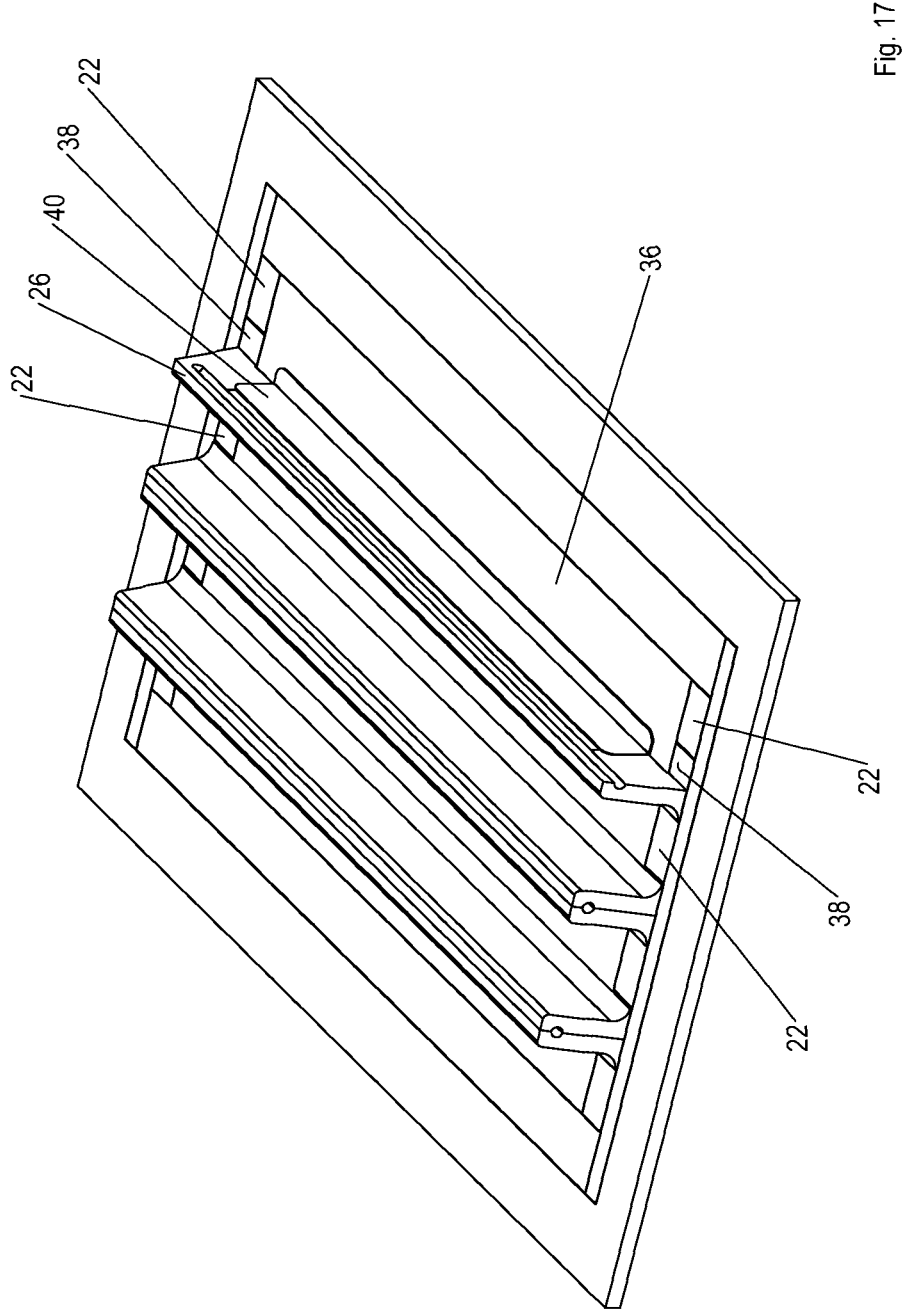
Figure 18:
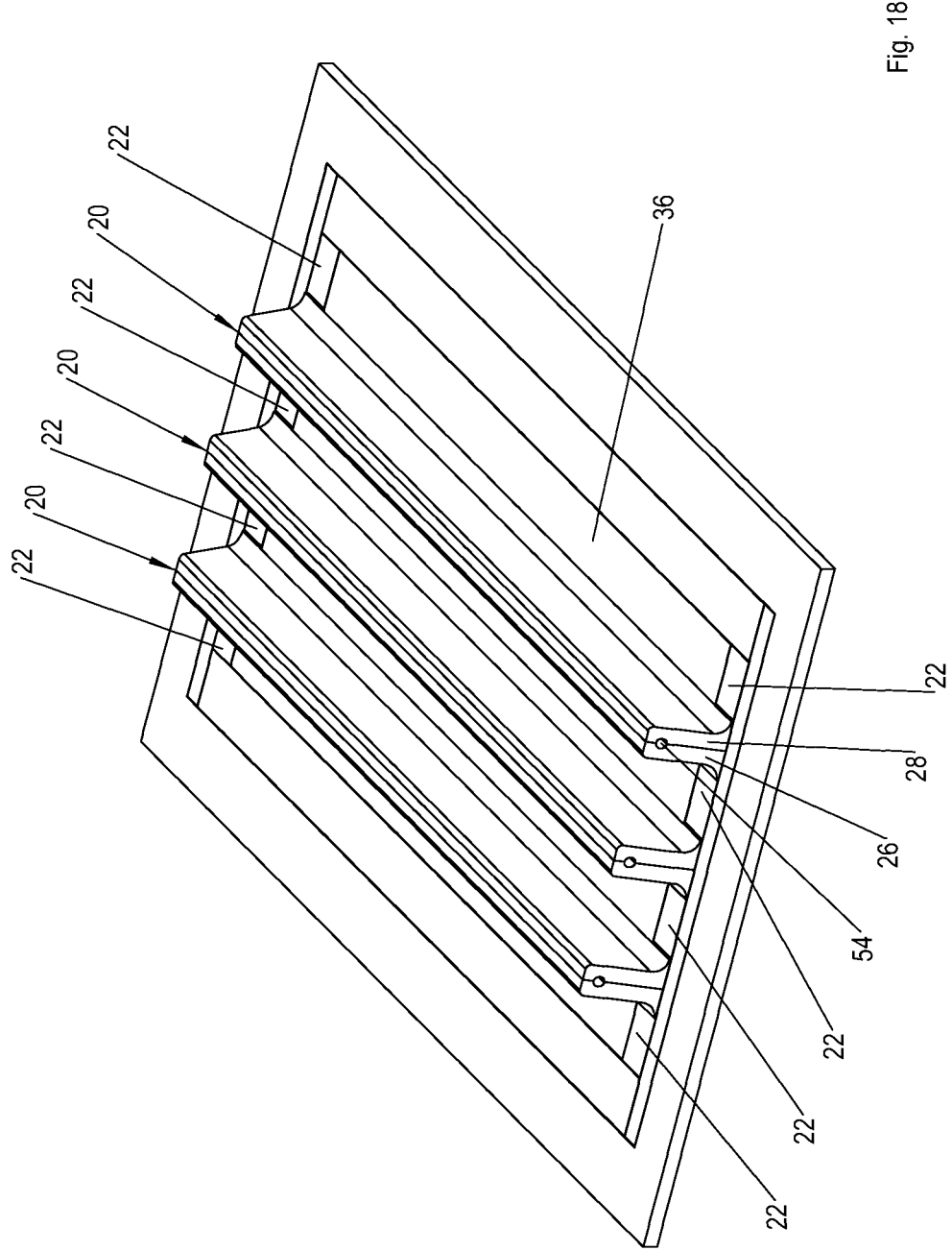

As depicted on FIGS. 17 and 18, the remaining opposing filler pieces 24 are removed from the clearances 38 in order to form a third stiffening element 4. After the filler pieces 24 have been removed, a dimensionally stable fibrous semi-finished product 40 is again pre-positioned between the clearances 38 on the sheet-like fibrous semi-finished product 36, and exactly aligned by means of two core sections 26, 28. After all mold cores 20 have been arranged, unnumbered joint locations between their respective core sections 26, 28 are sealed.

Figure 19:
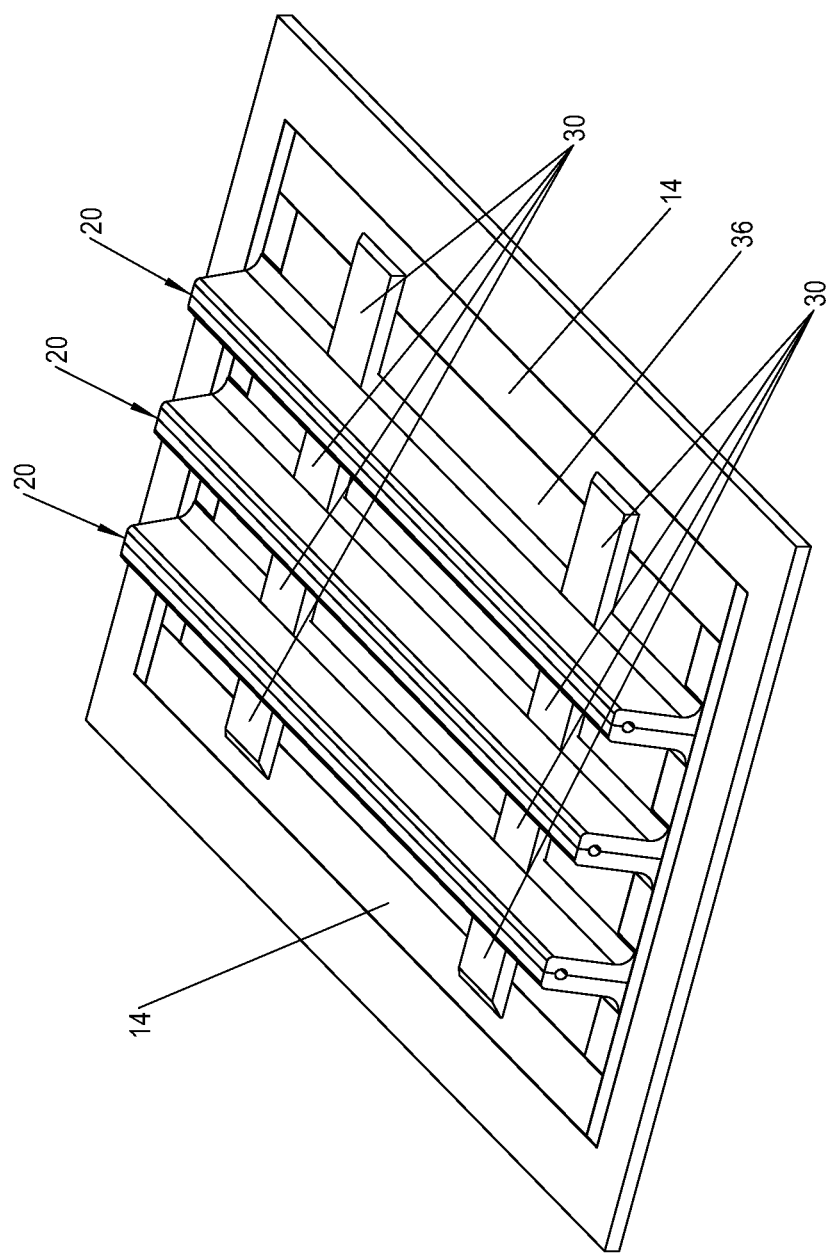

In order to prevent the mold cores 20 from deforming or changing position during resin infusion, the mold cores 20 or their core sections 26, 28 are supported on either side via pressure inserts 30 on their respectively adjacent mold core 20 or on the longitudinal strips 14, as depicted in FIG. 19, in particular given large stiffening element lengths and/or curved skin fields 2. The pressure inserts 30 extend in a transverse direction between the mold cores 20 and are joined with the latter via form-fit.

Figure 20:
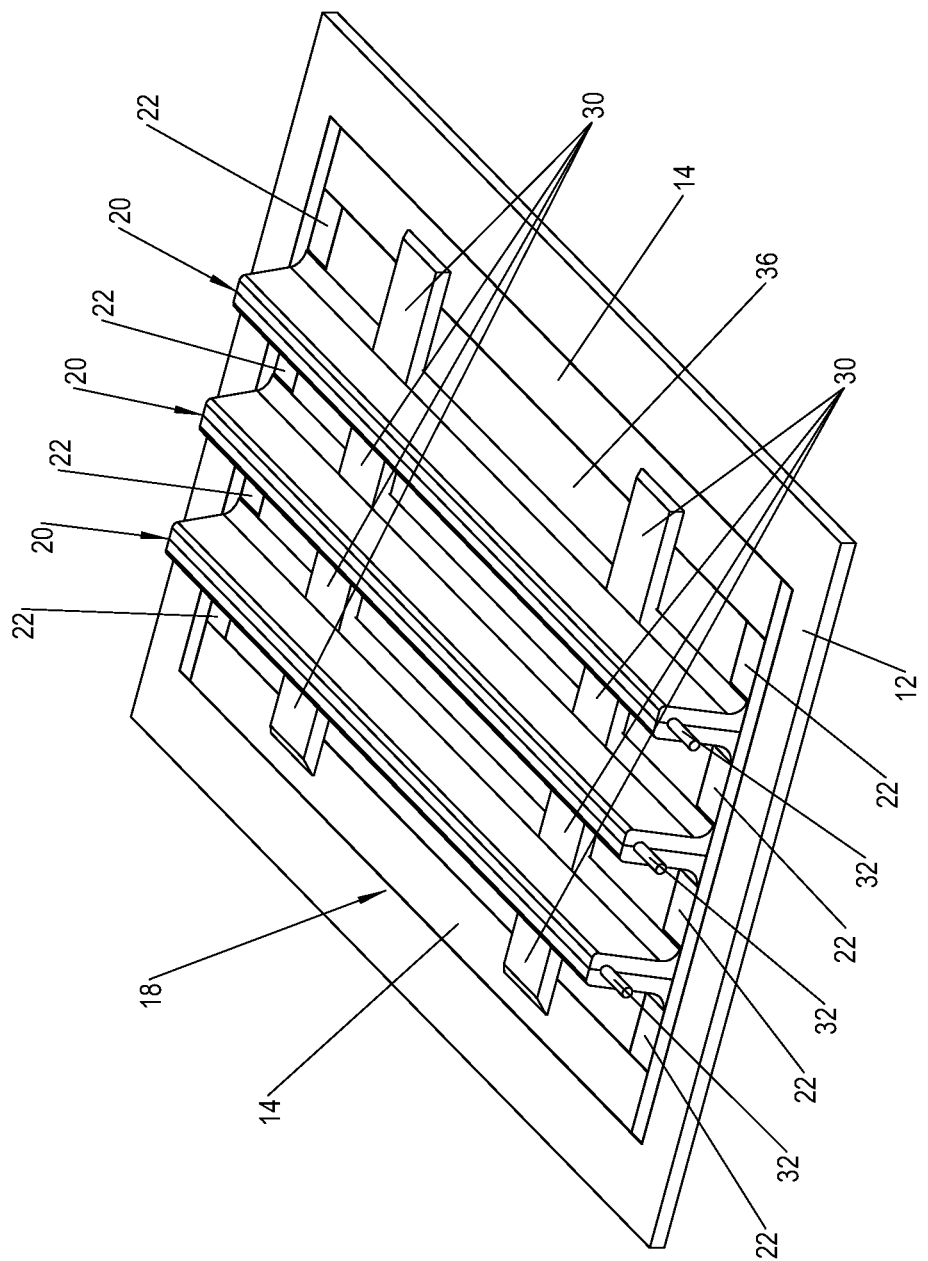

As illustrated in FIG. 20, one of the respective pipe sockets 32 is then inserted into one of the supply channels 54. The pipe sockets 32 are connected by most preferably flexible pipes to a resin supply or extraction location, which end in a central line if needed. For reasons of clarity, a vacuum structure used during component manufacture according to the infusion process is not depicted.

The now complete setup can be used for the following variants of the infusion process according to embodiments of the invention, wherein there are in principle two procedural groups each having two variants. The variants share in common that either casting takes place via web heads 55 or upper component regions, and extraction takes place on the foot side of the component via at least one lower component region, or extraction takes place via the web heads 55 or upper component regions, and gating takes place on the foot side of the component via at least one lower component region. Also common to the variants is that, when the mold 12 is horizontally aligned, the resin flows through the web 8 in only one vertical direction proceeding from the supply channels 54, and not simultaneously in a vertical opposite direction as in the cited references. This is achieved in particular by means of gating or extraction via the web heads 55. In addition, the variants share in common that the connecting channels 54 are indirectly connected with one of the receiving areas 52 on the web side by means of a respective gap 56 with a reduced cross section. For example, this can be very advantageous for fiber composite components to be fabricated with varying cross sections, since the gap 56 or its opening cross sections can be used to individually adjust the quantity of resin required for each supply channel side component region per unit of time, for example. In addition, it is preferred in all variants having a linear gating and linear extraction that the gating and extraction locations be oriented parallel to each other in different horizontal planes, so that the forming resin fronts are subject to a quasi pivoting motion of the kind that would take place given a relative horizontal displacement of the gating and extraction locations of 90°, for example.

In a first procedural group, gating takes place in the area of the mold 12, and extraction takes place in a linear manner via the webs 8 in the area of the mold cores 20. In a first variant, gating can here take place linearly along one or more lower component edge(s) on the foot side, for example along the longitudinal strips 14, while extraction can take place via the supply channels 54 or pipe sockets 32. In a second variant, gating takes place in a punctiform or linear manner in the planar fibrous semi-finished product 36, and extraction also takes place via the supply channels 54.

In the second procedural group, gating takes place linearly via the web heads 55 in the area of the mold cores 20, and extraction takes place in the area of the mold 12. In a first variant, gating can here take place via the supply channels 54 or pipe sockets 32, and extraction can take place linearly along one or more lower component edge(s) on the foot side, for example along the longitudinal strips 14. In a second variant, gating also takes place via the supply channels 54, while extraction takes place in a punctiform or linear manner in the planar fibrous semi-finished product 36.

Figure 21:
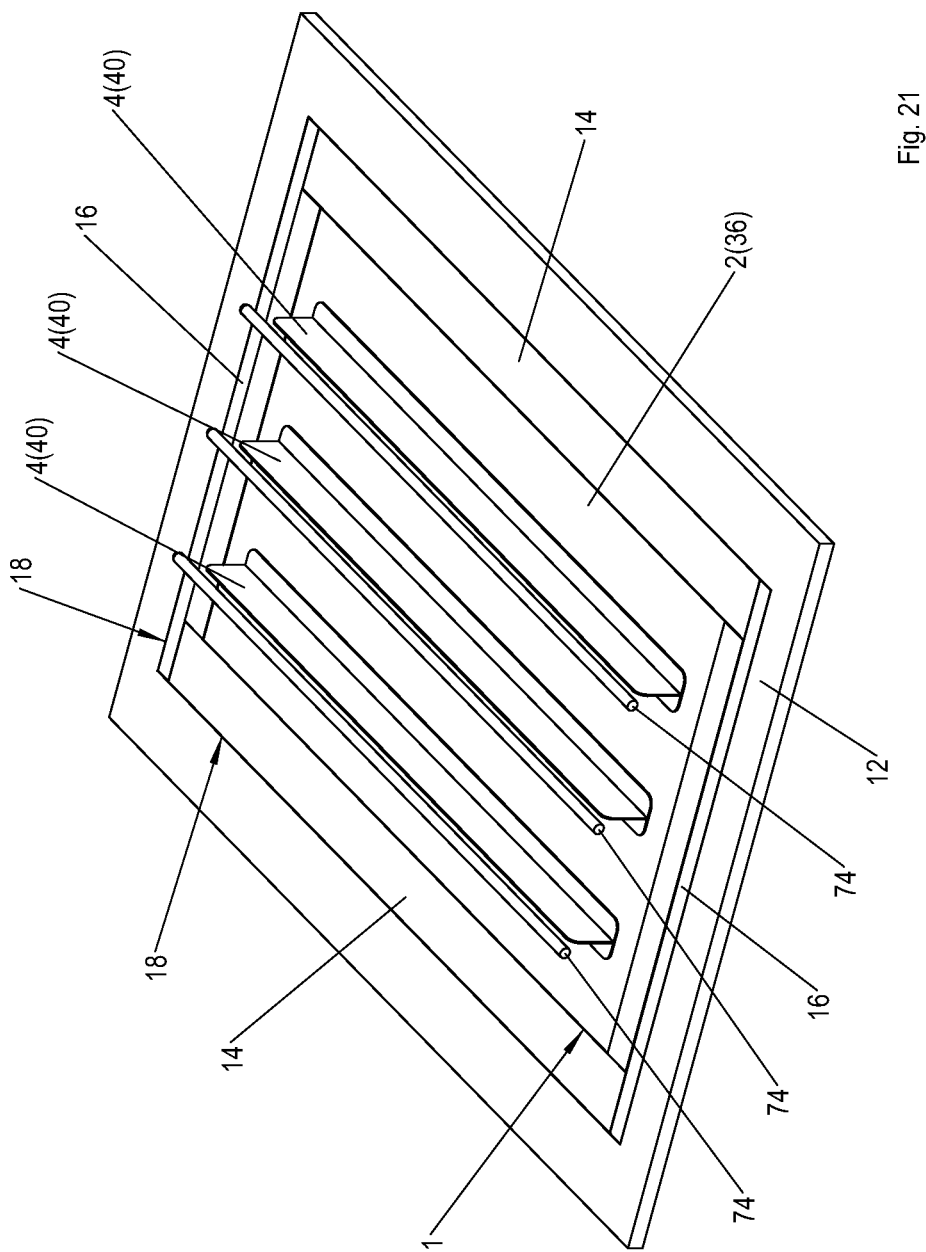
Figure 22:
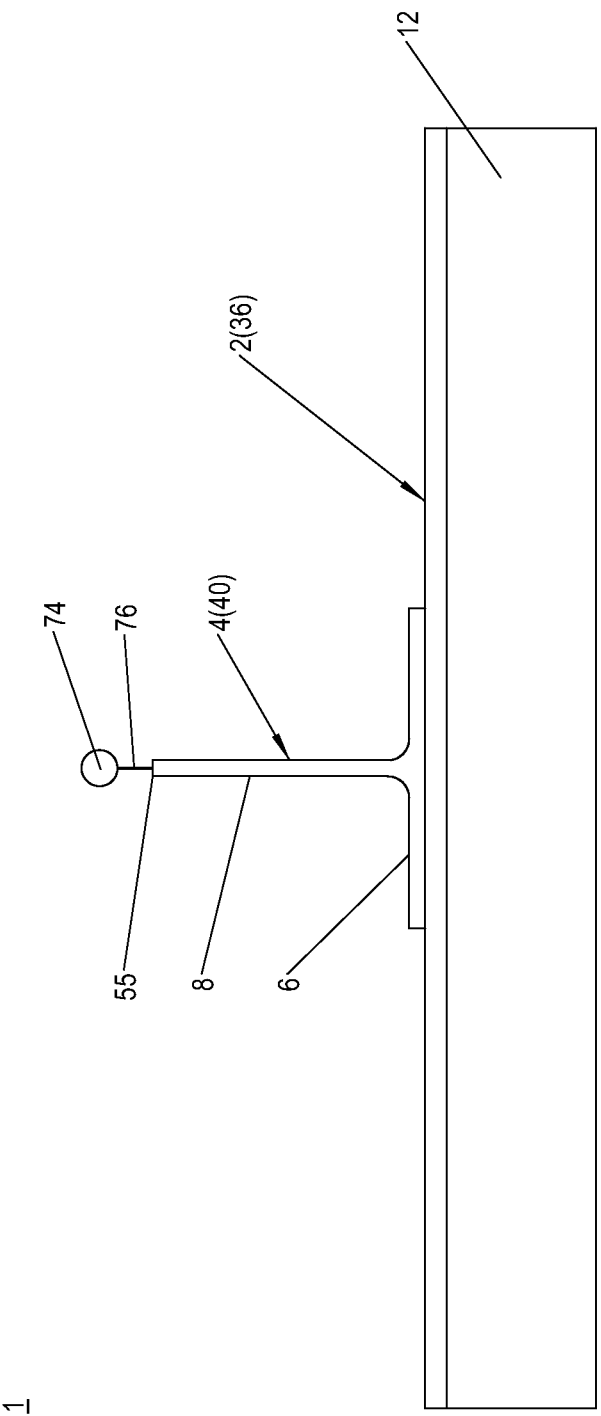

After the infusion process followed by hardening of the fiber composite component 1 during exposure to temperature, the resin lines, the pipe sockets 32 and the vacuum structure are removed. The pressure inserts 30, spacers 22 and finally the core sections 26, 28 are then removed for demolding the composite component as depicted on FIG. 21. As illustrated by FIG. 22, a resin residue 74 hardened in the supply channels 54 is joined with the stiffening elements 4 at the head via a resin film 76. However, since the gap widths in the core sections 26, 28 only measure a few tenths of a millimeter, these resin residues 74 can be easily snapped off along the thin resin film 76 at the respective stiffening element head 55. Because the fibrous semi-finished products 36, 40 are pro-vided in their final dimensions, other follow-up machining steps can in principle be omitted.

Of course, the invention is not limited to T-shaped stiffening elements 4, and can also be used, for example, in L-shaped, omega-type or hat-shaped stiffening elements 4 and the like. In addition, the invention is not limited to carbon fiber reinforced composite components, but rather the fibrous material can also be conceived as glass, aramide or UHM-WPE. In like manner, "SQRTM" prepregs are conceivable as fibrous semi-finished products.

Disclosed is a method for manufacturing a fiber composite component with an integral structural design, in which dimensionally stable fibrous semi-finished products fabricated at least to their final dimensions are arranged on a sheet-like fibrous semi-finished product, and resin gating takes place either via the mold cores along a respective component head of the dimensionally stable fibrous semi-finished products and extraction takes place in the area of a mold, or gating takes place in the area of the mold and extraction takes place via the mold cores along a respective component head of the dimensionally stable fibrous semi-finished products, as well as a device for implementing such a method, wherein the mold cores each have an integral receiving area for accommodating the fibrous semi-finished products and an integral supply channel on the component head side, which is open toward the receiving area and can be connected with a gating or extraction location.

While the invention has been particularly shown and described with reference to preferred embodiments thereof, it will be understood by those skilled in the art that various changes in form and details may be made therein without departing from the spirit and scope of the invention.

REFERENCE LIST

1 Fiber composite component
2 Skin field
4 Stiffening element
6 Foot
8 Web
10 Device
12 Mold
14 Longitudinal strip
16 Transverse strip
18 Frame
20 Mold core
22 Spacer
24 Filler pieces
26 Core section
28 Core section
30 Pressure inserts
32 Pipe sockets
34 Cavity
36 Sheet-like fibrous semi-finished product
38 Clearance
40 Dimensionally stable fibrous semi-finished product
42 Locating surface
44 Locating surface
46 Contact surface
48 Contact surface
50 Receiving area, foot
52 Receiving area, web
54 Supply channel
55 Web head
56 Gap
58 Half of receiving area
60 Half of supply channel 62 Half of gap
64 Support surface
66 Support surface
68 Partial area
70 Foot section
72 Foot section
74 Resin residue
76 Resin film

What is claimed is:

1. A method for manufacturing a fiber composite component having an integral structural design, the method comprising:

positioning a sheet-like fibrous semi-finished product in a mold which defines an outer contour of the fiber composite component;

arranging dimensionally stable fibrous semi-finished products on the sheet-like fibrous semi-finished product, each dimensionally stable fibrous semi-finished product having dimensions corresponding to a respective portion of the manufactured fiber composite component;

stabilizing and fixing each of the dimensionally stable fibrous semi-finished products in place using mold cores, each mold core consisting of two core sections which are disposed on respective sides of the dimensionally stable fibrous semi-finished product in a transverse direction and bordering an integral receiving area for accommodating the dimensionally stable fibrous semi-finished product, the mold cores together with the sheet-like fibrous semi-finished product completely enclosing the dimensionally stable fibrous semi-finished products;

resin infiltrating the semi-finished products using one of a first and a second gating process so as to form a construct, wherein the first gating process includes gating via the mold cores at a head of each dimensionally stable fibrous semi-finished product and performing extraction in an area of the mold, and wherein the second gating process includes gating in an area of the mold and performing extraction via the mold cores at the head of each dimensionally stable fibrous semi-finished product;

hardening the construct; and demolding the construct including removing the mold cores.

2. The method as recited in claim 1, wherein the gating is performed in a punctiform or linear manner in the sheet-like fibrous semi-finished product.

3. The method as recited in claim 1, wherein the gating is preformed in a punctiform or linear manner via at least one integral lateral edge region of the sheet-like fibrous semi-finished product.

4. The method as recited in claim 1, wherein the extraction is performed in a punctiform or linear manner in the sheet-like fibrous semi-finished product.

5. The method as recited in claim 1, wherein the extraction is performed in a punctiform or linear manner via at least one integral lateral edge region of the sheet-like fibrous semi-finished product.

6. The method as recited in claim 1, wherein the positioning the sheet-like fibrous semi-finished product in the mold includes disposing the sheet-like fibrous semi-finished product in a frame on the mold.

7. The method as recited in claim 1, wherein the mold includes ends and the mold cores are disposed over the sheet-like fibrous semi-finished product so as to sit on the ends of the mold.

8. The method as recited in claim 7, wherein each mold core is supported by at least one adjacent mold core.

* * * * *